United States Patent
Luria et al.

(10) Patent No.: US 8,136,987 B2
(45) Date of Patent: Mar. 20, 2012

(54) RATIO METER FOR TEMPERATURE SENSOR

(75) Inventors: Kosta Luria, Pardesiva (IL); Joseph Shor, Tel Mond (IL); Dadashev Oleg, Hadera (IL)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 12/319,003

(22) Filed: Dec. 31, 2008

(65) Prior Publication Data

US 2010/0164552 A1 Jul. 1, 2010

(51) Int. Cl.
*G01K 7/00* (2006.01)
*H01L 35/00* (2006.01)

(52) U.S. Cl. ........................................ 374/170; 327/512

(58) Field of Classification Search .................. 374/170, 374/178; 327/512, 513; 702/130–136
See application file for complete search history.

(56) References Cited

U.S. PATENT DOCUMENTS

| | | | | |
|---|---|---|---|---|
| 6,014,611 A * | 1/2000 | Arai et al. | ...... | 702/132 |
| 6,249,173 B1 * | 6/2001 | Nakaizumi | ...... | 327/513 |
| 7,209,015 B2 * | 4/2007 | Hashimoto | ...... | 327/512 |
| 7,587,262 B1 * | 9/2009 | Pippin | ...... | 702/132 |
| 8,025,438 B2 * | 9/2011 | Nakamura et al. | ...... | 374/170 |
| 2001/0028278 A1 * | 10/2001 | Ooishi | ...... | 327/512 |
| 2008/0002757 A1 | 1/2008 | Kosta | | |
| 2008/0198677 A1 * | 8/2008 | Son | ...... | 327/512 |
| 2010/0061172 A1 * | 3/2010 | Chen | ...... | 327/513 |
| 2010/0098133 A1 * | 4/2010 | Shin et al. | ...... | 374/170 |
| 2011/0204957 A1 * | 8/2011 | Kameyama et al. | ...... | 327/512 |
| 2011/0234300 A1 * | 9/2011 | Zhang et al. | ...... | 327/512 |
| 2011/0248772 A1 * | 10/2011 | Neidorff | ...... | 327/513 |

OTHER PUBLICATIONS

Office Action Received for Chinese Patent Application No. 200911000138.7, mailed on Sep. 14, 2011, 8 pages of Office Action including 4 pages Of English Translation.
Yan et al., "Design and study on measuring-controlling instrument in conservatory", Agricultural Mechanization Research, No. 12, pp. 166-169, Dec. 2007.
Banba et al., "A CMOS Bandgap Reference Circuit with Sub-1-V Operation", IEEE Journal of Solid-State Circuits, vol. 34, No. 5, May 1999, pp. 670-674.

* cited by examiner

*Primary Examiner* — G Bradley Bennett
(74) *Attorney, Agent, or Firm* — Eric R. Nordstrom

(57) ABSTRACT

In some embodiments, a new DTS implementation, which employs the conventional Vbe/ΔVbe temperature dependent principles but substitutes a voltage-to-frequency (V/F) based ratio meter for the DAC based approach. This new approach can result in a more simplified circuit that may be more variation tolerant and can require less power and area.

20 Claims, 3 Drawing Sheets

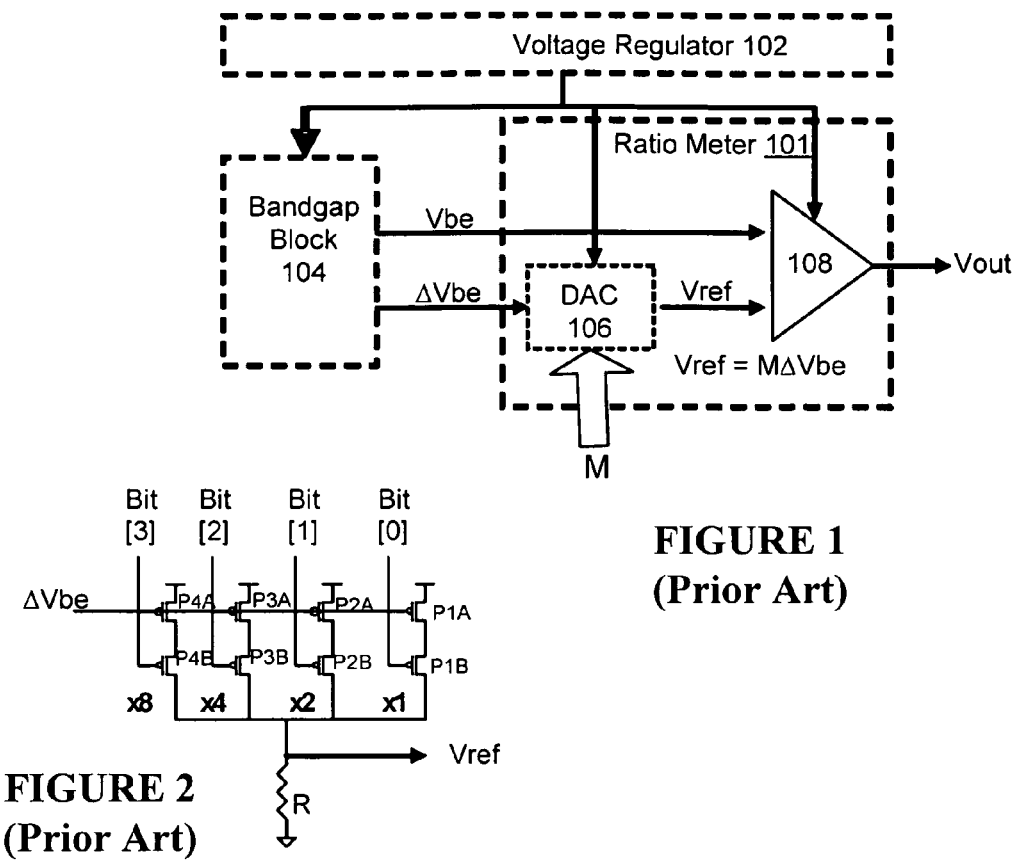
FIGURE 1
(Prior Art)
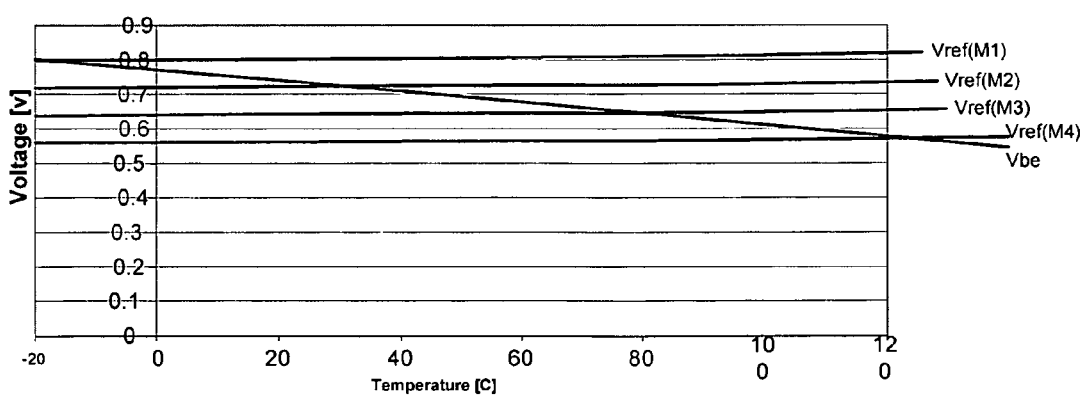
FIGURE 2
(Prior Art)
FIGURE 3
(Prior Art)

RATIO METER FOR TEMPERATURE SENSOR

BACKGROUND

FIG. 1 shows a conventional digital temperature sensor (DTS) using a well-known type bandgap circuit 104 coupled to a conventional ratio meter circuit 101. The ratio circuit 101 includes a current-sources based DAC (digital-to-analog converter) 106 to generate a temperature dependant function M (a multiplier for the DAC) based on the zeroing of a Vout value from comparator 108. The bandgap circuit 102 may comprise a standard diode-based PTAT (proportional to absolute temperature) block, which produces two temperature dependent DC voltages, Vbe and ΔVbe. In some embodiments, the Vbe voltage has a negative temperature slope, while the ΔVbe voltage has a positive or flat temperature slope. Through the DAC 106, the ΔVbe voltage is multiplied by a factor M. The DAC 106 may comprise a conventional current source type DAC, such as that shown in FIG. 2. In this example, M is a discrete 4-bit value corresponding to an analog level that multiplies ΔVbe, resulting in a value of: MΔVbe (also referred to as a Vref voltage). The Vref voltage has positive or flat temperature dependence, its slope and offset being determined by M. FIG. 3 is a graph showing different exemplary curves for Vbe and Vref at different values of M and how they are dependent on temperature.

The comparator 108 is used to detect the value of M for which the negative-sloped Vbe voltage is crossed by the positive or flat -sloped Vref voltage, i.e., when: Vbe−Vref=0. The value of M corresponds to a particular temperature, which can be identified using any suitable manner, e.g., via a look-up table. It can be seen that circuit 101 acts as a ratio meter because M is a ratio between Vbe and ΔVbe, which corresponds to the temperature of the bandgap circuit 102.

Unfortunately, a disadvantage of this approach arise from the current-source type DAC. Only a few transistors are used for the least significant (LS) bit, but each successive bit has double the number of transistors. (Each bit path in FIG. 2 is shown to have a single reference transistor PiA, but each transistor may actually comprise one or more transistors, depending on how the circuit is implemented, to achieve an appropriate binary weighted DAC.) A problem rises when it is necessary to cover a significant dynamic range, which typically follows from normal process variations. for example, depending on design concerns, a 9-bit or even a 10-bit DAC range may be needed. (Even more, many more, bits would be needed when non-binary weighted embodiments are employed.) In these cases, the number of transistors becomes prohibitively high and they may be spread over a large area, which can create side effect problems such as excessive leakage, $V_T$ variations, $R_o$ and drain effect variations, and the like. These effects can contribute to measurement errors, e.g., caused by differences in DAC behavior between the calibration and the system operation. In addition, when switching between different groups of current sources, the variations can cause the current to be a non-monotonic function of the digital bits. This can result in significant temperature errors. Another problem may be poor PSRR (power supply rejection ratio) of the DAC, which typically requires a good SFR (super filtered regulator) to supply power for the DTS. Adding the SFR leads to increased area, power consumption and an added need for calibration.

Accordingly, a new approach is desired.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a diagram of a conventional temperature sensing circuit.

FIG. 2 is a diagram of a digital to analog converter (DAC) for the temperature sensor circuit of FIG. 1.

FIG. 3 is a graph showing Vbe and Vref values for different values of M for the temperature sensor of FIG. 1.

DETAILED DESCRIPTION

In some embodiments, a new DTS implementation, which may employ conventional Vbe/ΔVbe temperature dependent principles but substitutes a voltage-to-frequency (V/F) based ratio meter for the DAC based approach is provided. This new approach can result in a more simplified circuit that may be more variation tolerant and can require less power and area.

Figure 4:
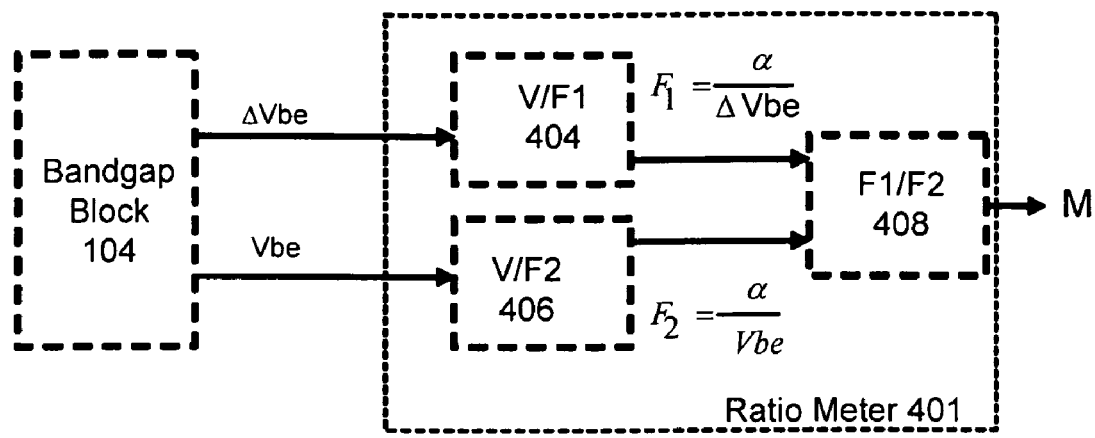
FIG. 4 is a diagram of a temperature sensor with an oscillator based ratio meter in accordance with some embodiments.

FIG. 4 shows a diagram of a DTS in accordance with some embodiments. It comprises a ratio meter 401 having voltage-to-frequency (V/F) converters (or oscillators) 404 (V/F1), 406 (V/F2), and a frequency divider, i.e., ratio calculator, (F1/F2) 408, coupled as shown to a conventional bandgap circuit 102 to provide a temperature factor M, whose value corresponds to that at the bandgap circuit. The bandgap circuit 102 comprises a diode-based PTAT block producing the two temperature dependent DC voltages, Vbe and ΔVbe. (In some bandgap circuits, the ΔVbe may sometimes be referred to as Vref or the like. (For example, see, e.g., Barba et al., "A CMOS Bandgap Reference Circuit with Sub-1-V Operation", IEEE JOURNAL OF SOLID-STATE CIRCUITS, VOL. 34, NO. 5, MAY 1999)

The Vbe and ΔVbe voltages have different temperature slopes. In some implementations Vbe has a negative temperature coefficient, while ΔVbe/Vref has a positive or zero (flat) temperature coefficient.

Figure 7:
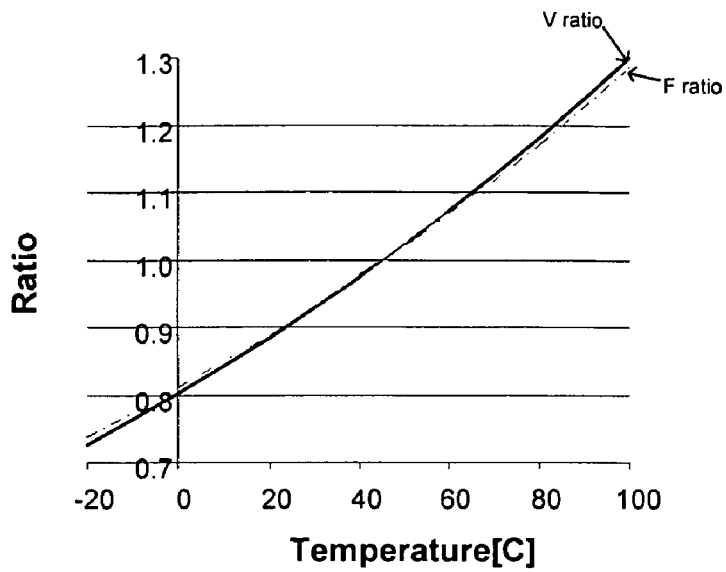
FIG. 7 is a graph showing voltage and frequency ratio curves vs. temperature for the circuit of FIG. 4 in accordance with some embodiments.

Assuming that the V/F circuits are suitably similar, i.e., with suitably similar gain constants ($\propto$), then the frequency generated from V/F1 (F1) will be: $\propto$/ΔVbe and the frequency (F2) from V/F2 will be: $\propto$/Vbe. Thus, when F1 is divided by F2 at divider 408, the result is: Vbe/ΔVbe, which is the voltage (or frequency) ratio M. This value M can then be correlated to a particular temperature, e.g., via a look-up table or the like. FIG. 7 is a graph showing exemplary ratio functions for F (e.g., F1/F2) and V (e.g., Vbe/ΔVbe) as a function of temperature. (With ideal conditions, they would be the same, but they deviate slightly with experimentally derived data as a result of non-ideal components, although the functions are very close.)

In the event that the two V/F circuit are highly dissimilar, as a result of random offset, it is possible to "chop" the inputs. In this procedure there are two measurements. In the first measurement, ΔVbe is connected to V/F1, while Vbe is connected to V/F2. The value of F1/F2 is stored as M1. In the second measurement, the inputs are switched and ΔVbe is connected to V/F2, while Vbe is connected to V/F1 and the value is stored as M2. The average between the two values of M1 and M2 is a more accurate temperature.

Figure 5:
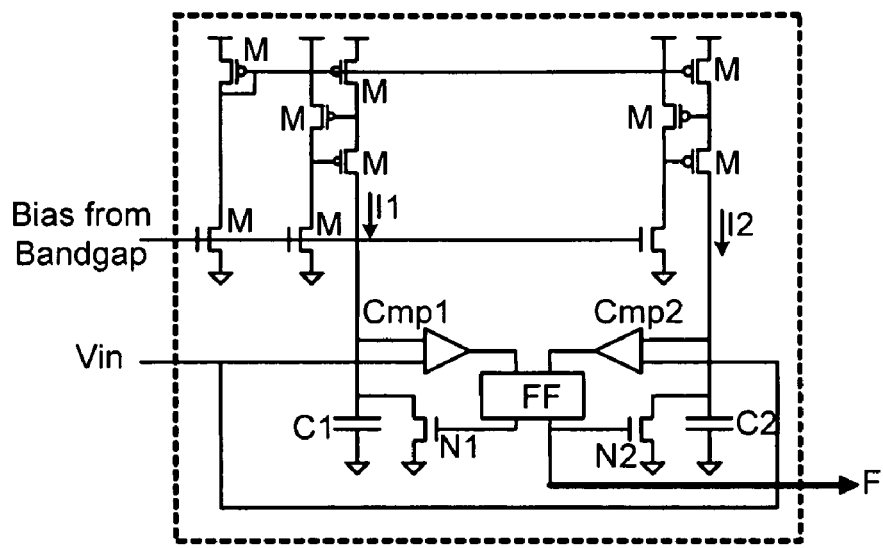
FIG. 5 is a diagram of an oscillator circuit suitable for use with the ratio meter of FIG. 4 in accordance with some embodiments.

FIG. 5 shows a voltage to frequency circuit that may be used in a ratio meter in accordance with some embodiments. It comprises switching transistors N1, N2, a flip-flop (FF), comparators (Cmp1, Cmp2), charge/discharge capacitors (C1, C2), and cascode-current mirror transistors (M), coupled together as shown.

In some embodiments, the charge/discharge capacitors (C1, C2) are metal capacitors. They each function as integration stages and are charged with suitably constant and equivalent currents (I1, I2), resulting in desired gain linearity and wide input voltage (Vin) range. In order to get the desired constant current with good PSRR and low drain effect, the boosted cascode-mirror technique is used, with the currents being mirrored from the bandgap block itself. (This is not required but may enhance accuracy and reduce error due to process variations and the like.) There can be plenty of headroom for the cascodes, because in many cases, sufficient supplies, e.g., 1.6~1.8. V, may be available.

The capacitors are coupled to comparators Cmp1 and Cmp2 with the outputs of the comparators coupled to the Flip Flop. With this configuration, each of the capacitors, C1 and C2, is charged in alternating sequence. At the time C1 is charging, C2 is discharging through transistor N2. When the voltage at C1 reaches the comparator (Cmp1) threshold (Vin), the flip-flop flips, and C2 then charges, as C1 discharges through N1, until it reaches the Cmp2 threshold (also at Vin). This continues, thereby generating an output frequency (F) that is inversely proportional to the level of Vin.

Figure 6:
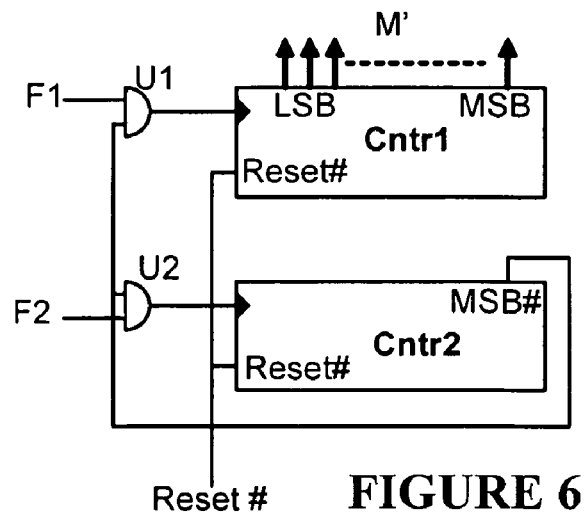
FIG. 6 is a diagram of a frequency ratio meter circuit suitable for use with the ratio meter of FIG. 4 in accordance with some embodiments.

FIG. 6 shows a frequency ratio calculator, which may be used for frequency divider 408, in accordance with some embodiments. This is a digital calculator that determines a value, M', corresponding to the ratio between F1 and F2. (The F1/F2 calculator actually finds a value M' that when divided by a constant value, results in the ratio M.) It comprises two counters, Cntr1 and Cntr2, and AND gates U1 and U2, coupled together as shown. It does not require an external clock, thus enabling the thermal sensor to perform functions that are not dependant on a PLL, for example, which can be beneficial since they can fail or be impaired under excessive thermal conditions, e.g., due to shutdown or impaired circuit operation.

In operation, assuming that both F1 and F2 are running, after the reset# is released, both counters start counting simultaneously. At the start, and for the count duration, the MSB# bit of Cntr2 is '1, so the F1 and F2 signals are enabled via their AND gates. They count until the MSB# bit turns to '0, which disables the AND gates. Thus, the MSB# bit of the second counter may be referred to as a "stop count" bit. The counts are halted until the next assertion of Reset#. In this way, for every count, the same value (let's call it Count2 ) is always in Cntr2. The Count2 value will be the value corresponding to MSB# being asserted, with the remaining bits being de-asserted.

Thus, when counting has stopped, the bits of the Cntr1 counter will contain the number (M') representing the ratio between F1/F2 divided by Count2. As an example, with an eleven bit counter for Cntr2, it can be seem that Cntr2 always counts to 2048.. The Cntr1 counter thus contains the temperature dependant ratio M*Count2 and thus, M could easily be attained simply by dividing the value at Cntr1 by Count2. It should be appreciated, however, that this would not have to b done since the constant, Count2, could be factored into whatever method is used to extract the temperature from M. That is, for example, if a lookup table is used, the values could be adjusted to account for the Count2 value. Said another way, they could be designated to correlate with Cntr1.

An advantage of using counters in this way is that they effectively inhibit oscillator flicker noise from the oscillators. That is, any switching noise caused by the oscillators will typically be impeded by the counters, which function as low pass filters, as they can provide the average number of counted pulses. The effects of thermal noise will also typically be limited by this filtering.

Figure 8:
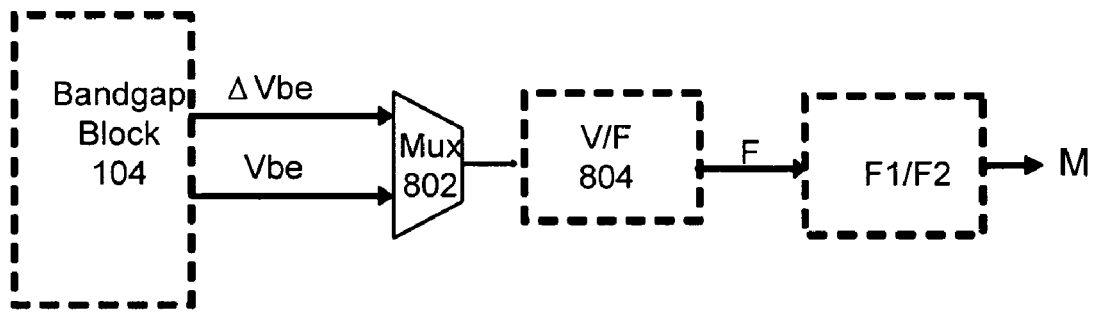
FIG. 8 is a diagram of a temperature sensor with an oscillator based ratio meter in accordance with additional embodiments.

It should be appreciated that any suitable circuits for implementing the various functions described herein may be employed. For example, a bandgap circuit is used to generate two temperature dependant voltages. However, in order to sense the temperature, any circuit producing two signals (e.g., voltage signals) with different temperature dependencies could be used. For example, a transistor based PTAT could be used. Moreover, the use of two oscillators, as shown in FIG. 4, is optional. For example, it is possible to use a single oscillator, such as is shown in FIG. 8. The Vref and Vbe signals could be coupled to oscillator, e.g., via a multiplexer 802, in sequence. In this case, though, a timer or clock may be needed in the F1/F2 divider to "count" each frequency for the same duration. The choice of oscillator can also be expanded. However, they should be linear with respect to their input voltage. It should also operate at a high span of Vin that covers full variation of Vbe and ΔVbe (or equivalents) across process and temperature variations.

Figure 9:
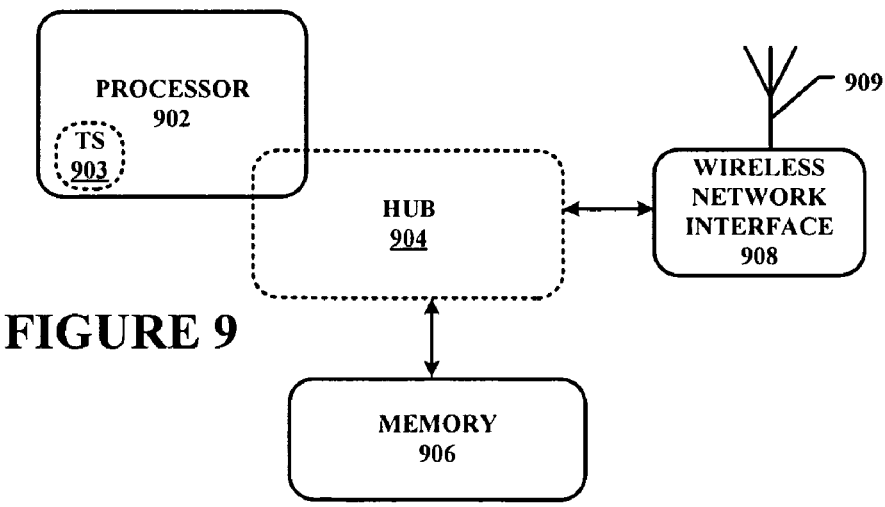
FIG. 9 is a diagram of a computer system having a processor with a temperature sensor having a ratio meter in accordance with some embodiments.

With reference to FIG. 9, one example of a portion of a computer platform is shown. The represented portion comprises a processor 902, hub functionality block 904, memory 906, wireless network interface 908, and an antenna 909. The processor 902 is coupled to the memory 906 and wireless network interface 908 through the hub 904. The hub functionality 904 may comprise one or more circuit blocks to perform various interface control functions (e.g., memory control, graphics control, I/O interface control, and the like. These circuits may be implemented on one or more separate chips and/or may be partially or wholly implemented within the processor 902. The processor 902 comprises at least one temperature sensor (TS) 903 with an oscillator based ratio meter, as discussed herein.

The memory 906 comprises one or more memory blocks to provide additional random access memory to the processor 902. It may be implemented with any suitable memory including but not limited to dynamic random access memory, static random access memory, flash memory, or the like. The wireless network interface 908 is coupled to the antenna 909 to wirelessly couple the processor 902 to a wireless network (not shown) such as a wireless local area network or a cellular network.

The mobile platform 401 may implement a variety of different computing devices or other appliances with computing capability. Such devices include but are not limited to laptop computers, notebook computers, personal digital assistant devices (PDAs), cellular phones, audio and/or or video media players, and the like. It could constitute one or more complete computing systems or alternatively, it could constitute one or more components useful within a computing system.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip comprising:
    at least one voltage-to-frequency (V/F) converter to receive first and second parameter dependent signals; and
    a circuit to yield a number or count corresponding to a value for the parameter, the value corresponding to the first and second parameter dependent signals.

2. The chip of claim 1, where the circuit is a counter.

3. The chip of claim 2, wherein the first and second parameter dependent signals comprise first and second parameter dependent voltages having different dependencies for the parameter.

4. The chip according to claim 2, where said parameter represents temperature.

5. The chip of claim 4, where the correspondence between temperature and a ratio between the first and second voltages is linear.

6. The chip of claim 4, where the first and second voltages are generated by a PTAT circuit.

7. The chip of claim 5, wherein the first voltage is Vbe, a diode voltage drop with a negative temperature dependence, and the second voltage is a reference voltage having a zero or positive temperature dependence.

8. The chip of claim 4, wherein the V/F converter is implemented with at least one current source charging a capacitor to generate a first integration voltage, said integration voltage being input to an input of a comparator and at least one of the first and second signals also being an input to the comparator.

9. The chip of claim 4, wherein the V/F converter comprises at least two voltage to frequency (V/F) converters, the first V/F converter receiving the first voltage and outputting a first frequency, the second V/F converter receiving the second voltage and outputting a second frequency.

10. The chip of claim 4, wherein there is a single V/F converter and the first voltage is input to the V/F converter during a first time phase, while the second voltage is input to the V/F converter during a second time phase.

11. The chip of claim 9, where the first and second frequencies are input to first and second counters.

12. The chip of claim 11, in which at least one of these counters fills up first, at which time it stops the other counter.

13. The chip of claim 12, in which the number in the other counter represents a temperature function.

14. A circuit comprising:

a first counter to count a ratio value; and a second counter comprising a stop count bit to stop the first counter at a constant count of the second counter.

15. The circuit of claim 14, comprising first and second gates to receive first and second frequency signals.

16. The circuit of claim 15, in which the first and second gates are enabled by the stop count bit of the second counter.

17. The circuit of claim 16, in which the first and second gates comprise AND gates.

18. A computer system, comprising:

a processor having at least one temperature sensor having an oscillator based ratio meter to provide a digital value corresponding to a temperature within the processor.

19. The computer system of claim 18, comprising an antenna to couple the processor to a wireless network.

20. The computer system of claim 18, in which the oscillator based ratio meter comprises first and second voltage-to-frequency converters to receive first and second temperature dependent voltages.

* * * * *